(12) United States Patent
Ohtaki et al.

(10) Patent No.: US 6,373,807 B1
(45) Date of Patent: Apr. 16, 2002

(54) OPTICAL PICKUP INFORMATION REPRODUCING APPARATUS AND INFORMATION RECORDING APPARATUS

(75) Inventors: Sakashi Ohtaki; Ikuya Kikuchi, both of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/391,178

(22) Filed: Sep. 8, 1999

(30) Foreign Application Priority Data

Sep. 9, 1998 (JP) .......................................... 10-255682

(51) Int. Cl.$^7$ ................................................. G11B 7/00
(52) U.S. Cl. ............................. 369/112.01; 369/112.06; 369/112.08; 369/112.23
(58) Field of Search ....................... 369/112.01, 112.02, 369/112.06, 112.08, 112.13, 112.23, 112.2, 112.26

(56) References Cited

U.S. PATENT DOCUMENTS

| 5,933,401 A | * | 8/1999 | Lee et al. | 369/112.06 |
| 6,049,518 A | * | 4/2000 | Tsuchiya et al. | 369/112.08 |
| 6,104,688 A | * | 8/2000 | Kikuchi et al. | 369/112.06 |
| 6,134,055 A | * | 10/2000 | Koike | 369/112.08 |

* cited by examiner

*Primary Examiner*—Nabil Hindi
(74) *Attorney, Agent, or Firm*—Nixon & Vanderhye PC (57) ABSTRACT

An optical pickup includes a light source for emitting more than two light beams whose wavelengths are different from each other, and an objective lens including a first lens and a second lens. The first lens is a lens for collecting each light beam onto a recording medium. The second lens is a lens for compensating chromatic aberration in the light beams. The second lens is placed on the first lens in contact and is located across the optical path of each light beam. The absolute value of the difference between the Abbe number of the first lens and the Abbe number of the second lens is greater than 10.

30 Claims, 5 Drawing Sheets

OPTICAL PICKUP INFORMATION REPRODUCING APPARATUS AND INFORMATION RECORDING APPARATUS

BACKGROUND OF THE INVENTION

1. Field of the Invention

The present invention relates to an optical pickup for optically recording and reproducing information on and from a record medium, such as an optical disk or the like, and more particularly relates to an optical pickup having a plurality of light sources for emitting a plurality of kinds of light beams whose wave lengths are different from each other, and further relates to an information reproducing apparatus and an information recording apparatus containing this optical pickup.

2. Description of the Related Art

Recently, an optical disk has been developed which can have the same diameter as those of CD and DVD and can further record information at a higher density than that of the DVD (hereafter, this is referred to as "a high dense optical disk". The DVD is an optical pickup having a record capacity equal to about seven times that of the CD. However, a memory capacity of the high dense optical disk exceeds that of the DVD. In this high dense optical disk, for example, about 15 gigabytes of information can be recorded on only one surface.

In parallel with the development of the high dense optical disk, it is considered to use a blue laser diode as a light source of a light beam to record and reproduce information. An oscillation wave length of this blue laser diode is 430 nm. It is shorter than that of a red laser diode (having an oscillation wave length of 650 nm) which is presently used for the record and reproduction of the DVD and the CD. As for the blue laser diode, for example, a blue semiconductor laser for using InGaN as an activation layer and an SHG laser for using $LiNbO_3$ as an SHG (Second Harmonic Generation) layer have been put into practical use.

It is desirable to use a blue laser light beam emitted from the blue laser diode, when recording the information on the high dense optical disk and when reproducing the information from the high dense optical disk.

The high dense optical disk is an optical pickup having the appearance similar to those of the CD and the DVD. Thus, it is desirable to record the information on the high dense optical disk and reproduce the information from the high dense optical disk by using a DVD player, a CD player or a CD/DVD compatible player.

On the other hand, an optical disk having an information record surface composed of two or more layers is developed in order to further improve the record capacity of the optical disk. Accordingly, the memory capacity of the optical disk can be increased by two times or more. The DVD having such two-layer structure is being realized.

An intermediate layer for dividing the two-layer information record surface is required to form the two-layer information record surface on the optical disk. Thin film made of gold (Au) is typically used as the intermediate layer. This reason is that in a case of the gold intermediate layer, since a degree of absorbing the red laser light beam is small, a stable laser light beam can be obtained.

However, the gold intermediate layer has the high degree of absorbing the blue laser light beam. Thus, the employment of the blue laser light beam disables the utilization of the gold intermediate layer. Actually, it is known that the employment of a laser light beam having a wave length of about 450 nm or less disables the utilization of the gold intermediate layer. As mentioned above, the blue laser light beam is required in order to record the information on the high dense optical disk or reproduce the information from the high dense optical disk. Hence, in the case of the high dense optical disk having the two-layer structure, it is necessary to use an intermediate layer other than the gold intermediate layer.

Thus, for example, in order to achieve a compatible type memory reproducing apparatus which can record and reproduce on and from both optical disks of the high density optical disk having the two-layer structure and the DVD having the two-layer structure, it is necessary to mount a blue laser light source and a red laser light source within an optical pickup and then switch between them based on the type of optical disk.

Next, an objective lens is required in order to collect the laser light beam onto the optical disk. In order to realize a small optical pickup having the blue laser light source and the red laser light source, it is desirable to collect the blue laser light beam and the red laser light beam through a single objective lens. However, if the two laser light beams are collected through the single objective lens, the dispersion resulting from wave length dependence of a refractive index occurs in each laser light beam. The occurrence of the dispersion causes chromatic aberration in each laser light beam. As a result, there may be a case that the laser light beam can not be excellently collected.

Figure 1:
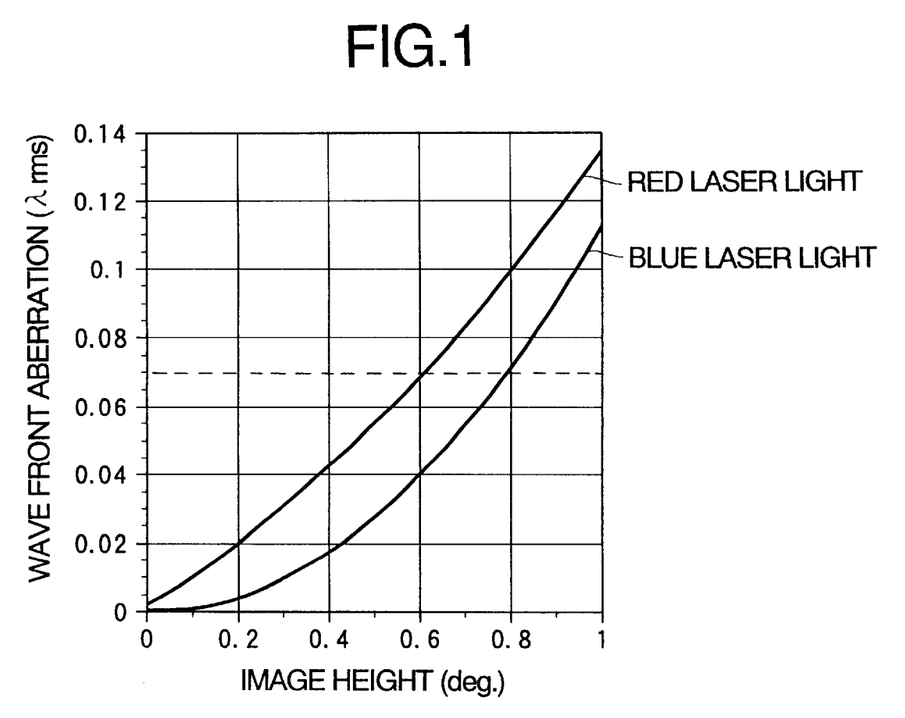
FIG. 1 is a view showing compensation for chromatic aberration through a single objective lens.

FIG. 1 is a graph showing the relationship between a wave front aberration RMS (a vertical axis) and an angle of an image height (a horizontal axis) in a blue laser light beam and the relationship between a wave front aberration RMS and an angle of an image height in a red laser light beam. Data on the graph is obtained in such a way that optical material typically used because of traditionally small dispersion is used to create an objective lens and then this objective lens is used to collect the red laser light beam and the blue laser light beam in an optimal condition. In addition, the angle of the image height implies an angle between a direction of a perpendicular of the objective lens and an optical axis of an incident laser light beam. The wave front aberration RMS implies a root mean square of an error between an ideal wave front without aberration and an actual wave front.

As shown in FIG. 1, when the image height is 0 degree, the chromatic aberration can be sufficiently compensated for both the laser light beams. However, as the image height becomes higher, each chromatic aberration is deteriorated. Actually, in the case of the red laser light beam, when the image height exceeds 0.6 degrees, the wave front aberration RMS exceeds 0.07. This value of 0.07 is a value known as a so-called Marshall limitation. When the wave front aberration exceeds 0.07, the function as the optical pickup can not be carried out any longer.

In addition, when gathering the data on the graph of FIG. 1, the blue laser light beam is made to enter the objective lens as collimated light (infinite system (afocal system)), in order to suppress as much as possible the chromatic aberration in each laser light beam. On the other hand, the red laser light beam is made to enter the objective lens as diffusion light or convergence light (finite system (focal system)).

Then, it may be considered to create the objective lens by using material having the smaller dispersion than those of conventional optical materials, for example, fused quartz or fluorite. However, in this case, a material cost is expensive, and a fused temperature is high, which causes the molding for the objective lens to be difficult, and thereby reduces the manufacturing yield.

Moreover, the following two techniques may be considered as the technique of reducing the manufacturing cost, making the molding process easier and ensuring the compatibility between the high dense optical disk and the DVD. The first technique is a technique of using a hologram element, making optical paths of the respective laser light beams different from each other (refracting them so that they are not parallel to each other) and then collecting the respective laser light beams. The second technique is a technique of providing a notch or a groove in a part of a transmission surface of an incident side of the objective lens.

However, although the first technique can perfectly remove the chromatic aberration and also create the optical pickup at a small size and a low cost, it has the problem that the utilization of the hologram causes a loss of a light quantity in each laser light beam to be large. The first technique further has the problem that it is difficult to remove a laser light beam other than the normal laser light beam incident on a detector (This is a laser light beam resulting from the fact that the original light beam is refracted by the hologram. This may be typically referred to as a stray light).

According to the second technique, although the optical pickup can be created at a small size and a low cost similarly to the first method, the loss of the light quantity in each laser light beam is still large. Also, the second technique has the problem that if the optical disk is tilted with respect to the optical axis of the objective lens, the light collection performance is extremely deteriorated.

SUMMARY OF THE INVENTION

It is therefore an object of the present invention to provide an optical pickup which can collect a plurality of kinds of light beams without substantial aberration, compensate the chromatic aberration with a small size and a simple structure and compensate the chromatic aberration without inflicting a loss of a light quantity on each light beam, and an information reproducing apparatus and an information recording apparatus which contain the pickup.

An optical pickup in accordance with the present invention includes: a light source for emitting a plurality of light beams whose wavelengths are different from each other; and an objective lens comprising a first lens for collecting each of the plurality of light beams onto a recording medium, and a second lens for compensating chromatic aberration in the plurality of light beams. The second lens is placed on the first lens in contact and is located across an optical path of each of the plurality of light beams.

Although the objective lens has the first lens and the second lens, it is a single unit because the second lens is placed on the first lens in contact. The objective lens in accordance with the present invention has at least two functions. Namely, it functions as a lens for collecting a plurality of light beams whose wavelengths are different from each other onto the recording medium. Also, it functions as a device for compensating chromatic aberration in a plurality of light beams whose wavelengths are different from each other. By using such an objective lens in the optical pickup, it is possible to create the optical pickup that does not inflict substantial aberration on each light beam.

For example, it is assumed that the optical pickup in accordance with the present invention is used in an information reproducing apparatus which is designed to reproduce information recorded on a plurality of kinds of recording medium by using a plurality of light beams whose wavelengths are different from each other. In this case, by using the objective lens in accordance with the present invention, each of the light beams can be collected on the recording medium accurately, and chromatic aberration in the light beams can be compensated. Therefore, optimum focusing on the recording medium can be achieved with respect to each light beam. Consequently, the accuracy of the reproduction of the information with respect to each recording medium can be increased.

Furthermore, the objective lens in accordance with the present invention is a single unit including the first lens and the second lens. Therefore, it is possible to create the optical pickup that can compensate the chromatic aberration without largely changing its structure, and also possible to miniaturize the optical pickup itself.

Moreover, the objective lens in accordance with the present invention can compensate chromatic aberration without inflicting the loss of the light quality on each light beam, because it does not use a hologram or a lens having a transmission surface on which notch or a groove is formed.

In the optical pickup according to the present invention, the second lens may be made of ultraviolet curing resin. Therefore, the second lens can be created by coating the ultraviolet curing resin and then curing it. Hence, it is possible to create the second lens having the accurate form in a simple process.

In the optical pickup according to the present invention, an absolute value of a difference between an Abbe number of the first lens and an Abbe number of the second lens is greater than 10, and each of the Abbe numbers is defined by using a refractive index with respect to helium d line, a refractive index with respect to mercury F line and a refractive index with respect to mercury C line. Therefore, it is possible to compensate the chromatic aberration occurring in the light beams.

In the optical pickup according to the present invention, the second lens has a first surface and a second surface which are opposite each other and both of which are located across the optical path of each of the plurality of the light beams, the first surface is in contact with the first lens, and the second surface is flat. Therefore, it is possible to prevent eccentricity from occurring between the first lens and the second lens, when the second lens is placed on the first lens to then create the objective lens. Hence, the objective lens which can surely compensate the chromatic aberration can be created in a simple process.

In the optical pickup according to the present invention, an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is an axisymmetric aspheric-surface whose symmetry axis corresponds to each of the central axis of the first lens and the central axis of the second lens. Therefore, each of the light beams can be effectively collected while miniaturizing the objective lens.

In the optical pickup according to the present invention, an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is a spherical surface. Therefore, each of the light beams can be effectively collected while miniaturizing the objective lens.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Embodiments of the present invention will be described below.

At first, a first embodiment according to the present invention will be described below with reference to FIGS. 2 and 3A, 3B. In addition, the first embodiment described below is an embodiment in which the present invention is applied to an information reproducing apparatus which reproduces information recorded on DVD by using a red laser light beam and also reproduces information recorded on a high density optical disk by using a blue laser light beam.

Also, each of the high dense optical disk and the DVD according to the first embodiment has a two-layer information record surface.

Figure 2:
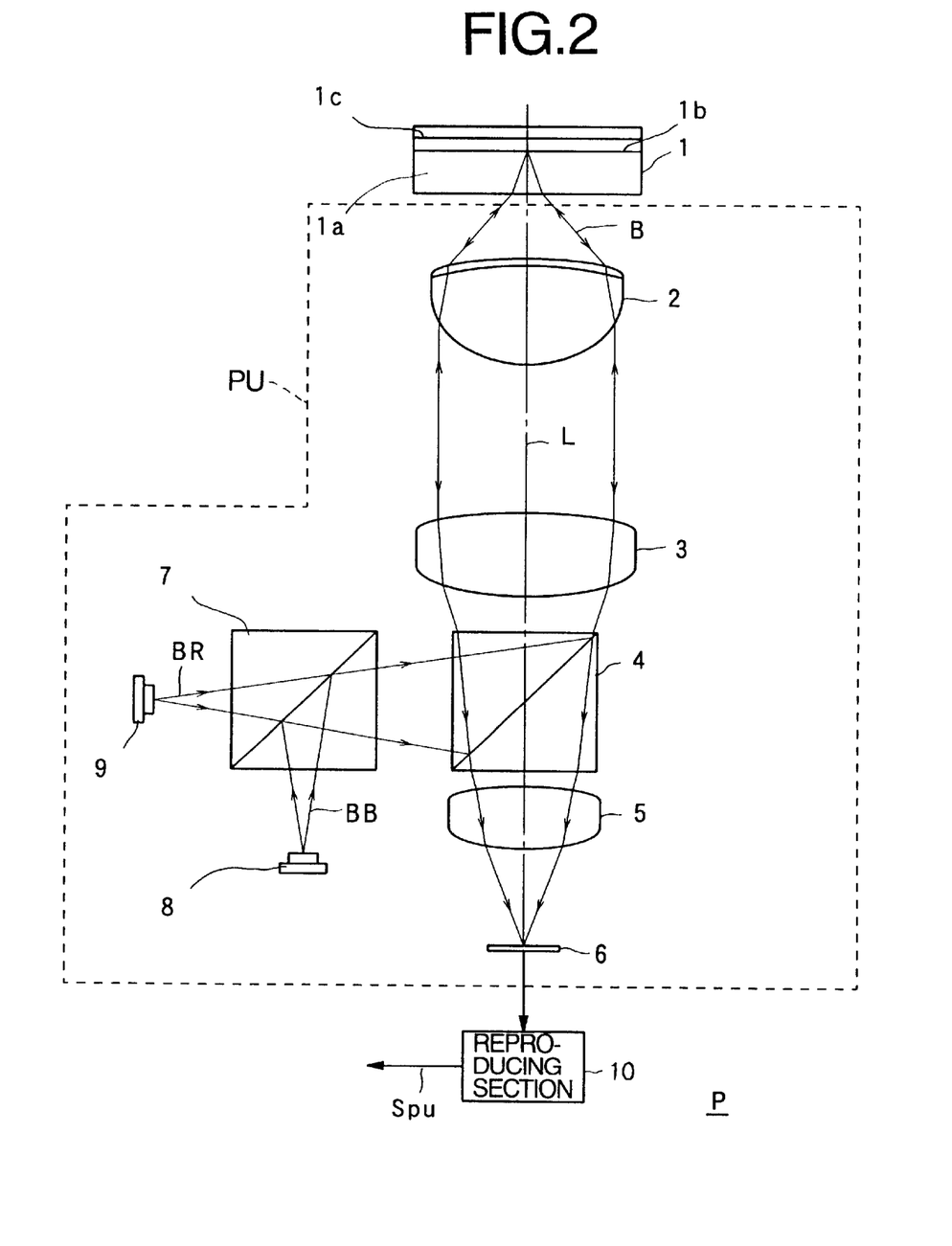
FIG. 2 is a block diagram showing the schematic configuration of an information reproducing apparatus of a first embodiment.
Figure 3A:
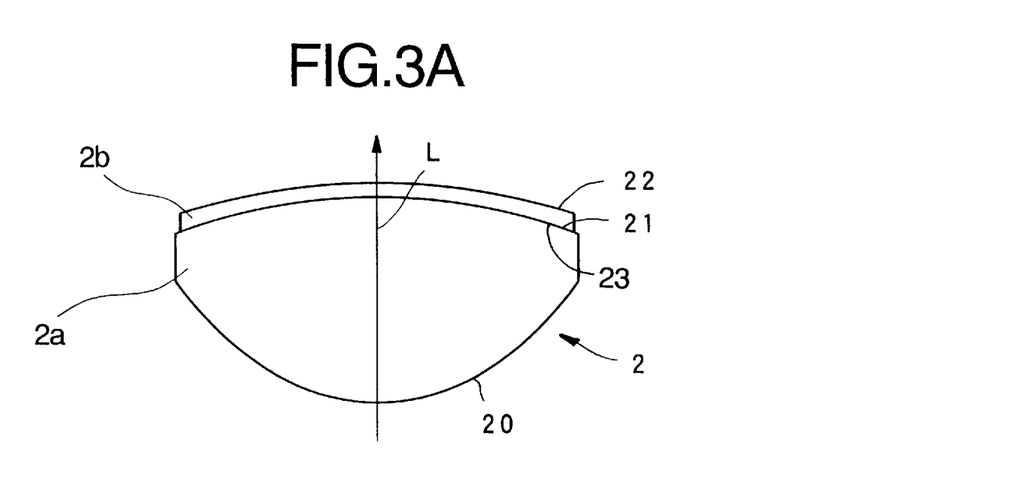
FIG. 3A is a longitudinal section view of an objective lens of the first embodiment.
Figure 3B:
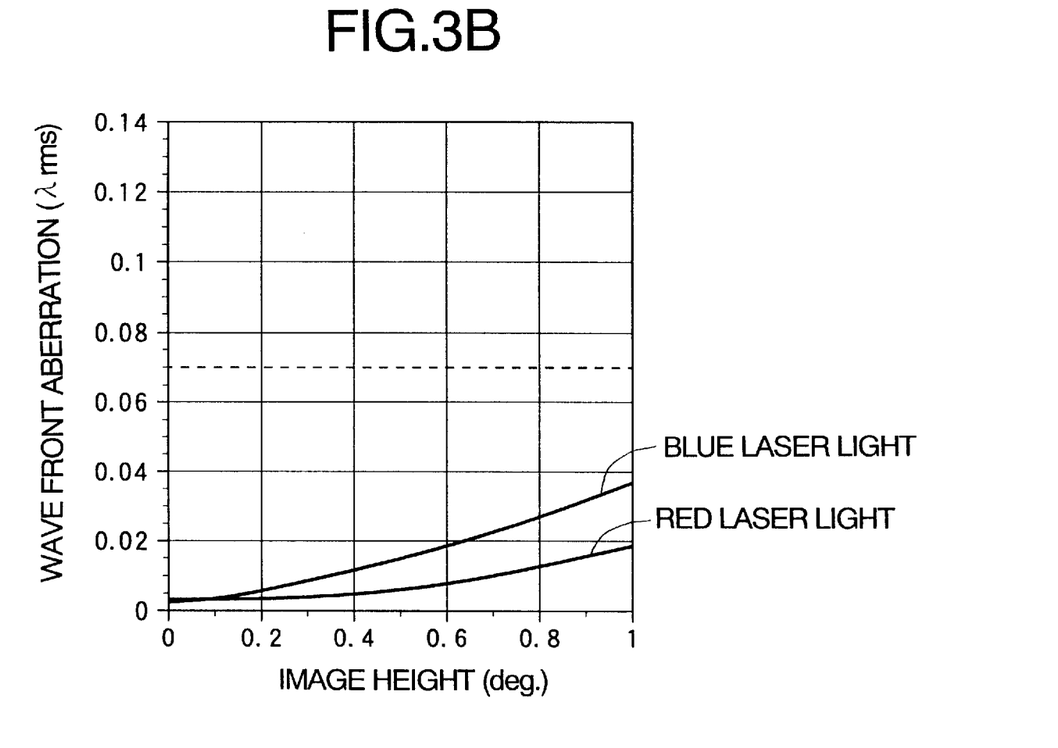
FIG. 3B is a view showing compensation for chromatic aberration of the objective lens shown in FIG. 3A.

Moreover, FIG. 2 is a block diagram showing the schematic configuration of the information reproducing apparatus according to the first embodiment, and FIGS. 3A and 3B are views showing the section structure and the performance of an objective lens according to the first embodiment.

As shown in FIG. 2, the information reproducing apparatus P according to the first embodiment is provided with: a blue laser diode 8 for emitting a blue laser light beam BB to reproduce the information from a high dense optical disk 1 serving as a record medium; a red laser diode 9 for emitting a red laser light beam BR to reproduce the information from the DVD; a dichroic prism 7 for reflecting the blue laser light beam BB and transmitting the red laser light beam BR and thereby making the optical axis of the blue laser light beam BB and the optical axis of the red laser light beam BR coincide with each other; a polarization beam splitter 4 for reflecting any one of the red laser light beam BR and the blue laser light beam BB; a collimator lens 3 for converting any one of the reflected red laser light beam BR and blue laser light beam BB into a collimated light; an objective lens 2 for collecting any one of the collimated red laser light beam BR and blue laser light beam BB onto an information record surface 1b or 1c within the high dense optical disk 1 or the DVD; the high dense optical disk 1 or the DVD serving as the record medium which has a protection layer 1a transparent to the red laser light beam BR and the blue laser light beam BB and has the two-layer information record surfaces 1b, 1c; a collective lens 5 for collecting on a detector 7 any one of the red laser light beam BR and the blue laser light beam BB which are transmitted through the objective lens 2, the collimator lens 3 and the polarization beam splitter 4, when a polarization surface is rotated by the fact that it is reflected on the respective information record surfaces 1b, 1c of the high dense optical disk 1 or the DVD; the detector 7 serving as a light receiving unit for receiving any one of the collected red laser light beam BR and blue laser light beam BB and then outputting a reception signal Sp; and a reproducing section 10 for reproducing the information recorded on the high dense optical disk 1 or the DVD in accordance with the outputted reception signal Sp, generating a reproduction signal Spu and then outputting it to an external speaker display and the like (not shown).

In addition, an optical pickup PU in the present invention is constituted by the blue laser diode 8, the red laser diode 9, the dichroic prism 7, the polarization beam splitter 4, the collimator lens 3, the objective lens 2, the collective lens 5 and the detector 7, among the above-mentioned configuration members.

In this configuration, if any of the red laser light beam BR and the blue laser light beam BB is emitted from any one of the blue laser diode 8 and the red laser diode 9, respective optical axes are made coincident with each other in the dichroic prism 7. After that, it is radiated through the polarization beam splitter 4, the collimator lens 3 and the objective lens 2 to the high dense optical disk 1 or the DVD.

Also, any of the red laser light beam BR and the blue laser light beam BB which are reflected on the high dense optical disk or the DVD is radiated through the objective lens 2, the collimator lens 3, the polarization beam splitter 4 and the collective lens 5 to the detector 7.

FIG.2 shows only the sections with regard to the present invention in the information reproducing apparatus P, However, in addition to them, the actual information reproducing apparatus P includes a tracking servo controller and a focus servo controller for performing so-called tracking servo control and focus servo control on any one radiation position of the red laser light beam BR and the blue laser light beam BB, a CPU for controlling the whole operation of the information reproducing apparatus P, or an input operator for inputting necessary information and the like.

The detailed structure of the objective lens 2 according to the present invention will be described below with reference to FIGS. 3A and 3B.

FIG. 3A shows the longitudinal section structure of the objective lens 2. The objective lens 2 is composed of a collective lens 2a serving as a standard lens for collecting any one of the red laser light beam BR and the blue laser light beam BB onto any one of the information record surfaces 1b and 1c, and a contact lens 2b which is closely laminated on the collective lens 2a and compensates the chromatic aberration occurring in the red laser light beam BR or the blue laser light beam BB because of the light collection action caused by the collective lens 2a (namely, the light collection action resulting from the refraction of each laser light beam).

Here, the collective lens 2a is created by machining and molding plastic or glass. On the other hand, the contact lens 2b is made of ultraviolet curing resin (actually, for example, 2P (Photo Polymer) material and the like are used).

As for the respective forms, an incident surface 20 and a boundary surface 21 in the collective lens 2a and an emission surface 22 and a boundary surface 23 in the contact lens 2b are configured so as to be located on the same axis and in the form of axisymmetric rotational aspheric surface whose symmetrical axis corresponds to an optical axis L of the red laser light beam BR or the blue laser light beam BB.

As for a method for creating the objective lens 2, the collective lens 2a is firstly molded by a predetermined method. After that, the ultraviolet curing resin to be made into the contact lens 2b is coated on the boundary surface 21. Moreover, ultraviolet is radiated to the coated ultraviolet curing resin to thereby cure it. Accordingly, the contact lens 2b is created, and the objective lens 2 is completed.

Moreover, an absolute value of a difference between an Abbe number ν dg of the optical material constituting the collective lens 2a and an Abbe number ν dp of the ultraviolet curing resin constituting the contact lens 2b is set to be greater than 10. That is, the equation:

$$|vdg-vdp|>10 \tag{1}$$

is defined.

Here, the Abbe number ν dg is an Abbe number defined by using a refractive index Ndg with respect to helium d line (a wave length of 587.56 nm), a refractive index NFg with respect to mercury F line (a wave length of 486.13 nm) and a refractive index NCg with respect to mercury C line (a wave length of 656.27 nm), among the Abbe numbers of the optical material constituting the collective lens 2a. Then, this ν dg is represented as follows:

$$vdg=(Ndg-1)/(NFg-NCg) \tag{2}$$

Similarly, the Abbe number ν dp is an Abbe number defined by using a refractive index Ndp with respect to the helium d line, a refractive index NFp with respect to the mercury F line and a refractive index NCp with respect to the mercury C line, among the Abbe numbers of the ultraviolet curing resin constituting the contact lens 2b. Then, this ν dp is represented as follows:

$$vdp=(Ndp-1)/(NFp-NCp) \tag{3}$$

Here, the reason why the Abbe number of each material is established so as to have the relation of the equation (1) is that the above-mentioned difference between the Abbe numbers is necessary for the sufficient compensation for the chromatic aberration occurring in the red laser light beam BR or the blue laser light beam BB which is transmitted through the objective lens 2.

Thus, if the absolute value of the difference between the Abbe number ν dg and the Abbe number ν dp is less than 10, it is impossible to sufficiently compensate the chromatic aberration.

In addition, it is confirmed that if the sufficient compensation for the chromatic aberration is tried in the condition that the absolute value is less than 10, the contact lens 2b has a thickness which can not be achieved in the manufacturing process.

The structure of the collective lens 2 will be further actually described below.

At first, for example, M-BaCD5 (Ndg=1.589 and ν dg=61.3) made by HOYA Corporation having a performance of low dispersion can be actually used as the optical material constituting the collective lens 2. Moreover, for example, 2P material (Ndp=1.533 and ν dp=33.0) made by DAINIHON INK Corporation having a performance of high dispersion can be actually used as the ultraviolet resin material constituting the contact lens 2b.

As still another example, M-Laf81 (Ndg=1.750 and ν dg=35.0) made by HOYA Corporation having a performance of high dispersion may be used as the optical material constituting the collective lens 2, and 2P material (Ndp=1.480 and ν dp=58.0) made by DAINIHON INK Corporation having a performance of low dispersion may be used as the ultraviolet resin material constituting the contact lens 2b.

On the other hand, as the forms of the collective lens 2a and the contact lens 2b, it is proper to create them, for example, as follows.

That is, as for the incident surface 20, it is proper to let a curvature radius thereof be 1.541198 mm and an effective diameter thereof be 1.400000 mm and let a thickness of a center of the collective lens 2a be 1.800000 mm.

Also, as for the boundary surface 21, it is proper to let a curvature radius thereof be −49.094969 mm and an effective diameter thereof be 1.400000 mm.

Moreover, as for the emission surface 22, it is proper to let a curvature radius thereof be −5.039060 mm and an effective diameter thereof be 1.400000 mm and let a thickness of a center of the collective lens 2a be 0.200000 mm.

Furthermore, as for the whole form of the incident surface 20, it, is proper to respectively establish the aspherical coefficients representative of the form as follows:

| | |
|---|---|
| AS1 = 1.1600 × 10⁻⁵ | AS2 = 0.005090 |
| AS3 = 0.000935 | AS4 = 0.000216 |
| AS5 = −4.1028 × 10⁻⁵ | AS6 = 2.7469 × 10⁻⁵ |
| AS7 = −6.7178 × 10⁻⁷ | AS8 = −1.8969 × 10⁻⁷ |
| AS9 = −3.4379 × 10⁻⁷ | AS10 = 8.9932 × 10⁻⁸ (4) |

Also, as for the whole form of the boundary surface 21, it is proper to respectively establish the aspherical coefficients representative of the form as follows:

| | |
|---|---|
| AS1 = 0.043057 | AS2 = −0.118580 |
| AS3 = 0.061341 | AS4 = −0.017331 |
| AS5 = 0.000668 | AS6 = −0.000432 |
| AS7 = −0.008997 | AS8 = −0.006742 |
| AS9 = 0.004765 | AS10 = 0.029489 (5) |

Moreover, as for the whole form of the emission surface 22, it is proper to respectively establish the aspherical coefficients representative of the form as follows:

| | |
|---|---|
| AS1 = −4.5099 × 10⁻⁵ | AS2 = 0.047940 |
| AS3 = −0.033969 | AS4 = 0.019920 |
| AS5 = −0.007563 | AS6 = 0.001348 |
| AS7 = 2.9059 × 10⁻⁵ | AS8 = 8.1433 × 10⁻⁵ |
| AS9 = −8.3329 × 10⁻⁵ | AS10 = −2.9477 × 10⁻⁵ (6) |

Here, the above-mentioned aspherical coefficient in each equation is a coefficient used to represent the form of the axisymmetric rotation aspheric surface.

That is, for example, if a top of the incident surface 20 is in contact with an xy plane at an origin of coordinates and has a z axis (optical axis L) as a symmetrical axis, when a distance from the z axis to any point A on the plane of the incident surface 20 is assumed to be a, the incident surface 20 is represented as follows:

$$z = AS1 \times \rho^2 + AS2 \times \rho^4 + AS3 \times \rho^6 + \ldots AS_m \times \rho^{2m} \quad (7\text{-}1)$$

$$\rho^2 = x^2 + y^2 \quad (7\text{-}2)$$

Degree of the compensation for the chromatic aberration in a case of using the objective lens 2 having the above-mentioned design values will be described below with reference to FIG. 3B. In addition, in FIG. 3B, a horizontal axis indicates an angle of an image height, similarly to FIG. 1, and a vertical axis indicates a wave front aberration RMS.

As can be evident from FIG. 3B, according to the objective lens created by using the above-mentioned design values, the chromatic aberration in the case where the angle of the image height is at least 1 degree as well as the chromatic aberration on the axis is excellently compensated for both the red laser light beam BR and the blue laser light beam BB. Only chromatic aberration lower than the above-mentioned Marshall limitation is induced in any case.

As mentioned above, according to the objective lens 2 in the information reproducing apparatus P of the first embodiment, the objective lens 2 composed of the collective lens 2a and the contact lens 2b closely laminated thereon compensates the chromatic aberration in the red laser light beam BR or the blue laser light beam BB. Thus, in the optical pickup PU that collects the red laser light beam BR and blue laser light beam BB, in which the wave lengths are different from each other, through the single objective lens 2 and accordingly reproduces the information, it is possible to create the optical pickup PU that does not inflict substantial aberration on each light beam.

Also, the objective lens 2 is created by closely laminating the contact lens 2b on the collective lens 2a. Thus, it is possible to create the optical pickup PU that can compensate the chromatic aberration without largely changing the structure, and also possible to miniaturize the optical pickup PU itself.

Moreover, the objective lens is created by closely laminating the contact lens 2b on the collective lens 2a. Thus, the chromatic aberration can be compensated without inflicting the loss of the light quality on the red laser light beam BR or the blue laser light beam BB.

Also, the contact lens 2b is made of the ultraviolet curing resin. Thus, the contact lens 2b can be created by coating the ultraviolet curing resin and then curing it, when the objective lens 2 is manufactured. Hence, it is possible to create the contact lens 2b having the accurate form in a simple process.

Furthermore, the absolute value of the difference between the Abbe number ν dg of the collective lens 2a and the Abbe number ν dp of the contact lens 2b is greater than 10. Thus, it is possible to compensate the chromatic aberration occurring in the red laser light beam BR or the blue laser light beam BB.

Moreover, the central axis of the collective lens 2a and the central axis of the contact lens 2b coincide with each other, and further the respective transmission surfaces (the incident surface 20, the boundary surface 21, the emission surface 22 and the boundary surface 23) in the collective lens 2a and the contact lens 2b are configured so as to be the axisymmetric rotational aspheric surfaces whose symmetrical axes correspond to the respective optical axes of the light beams. Thus, both the respective light beams can be effectively collected while miniaturizing the objective lens 2.

Also, the information is reproduced in accordance with the reception signal Sp from the detector 6. Thus, it is possible to compensate the chromatic aberration in each light beam and surely reproduce the information by means of the respective light beams.

A second embodiment according to the present invention will be described below with reference to FIGS. 4A and 4B.

Figure 4A:
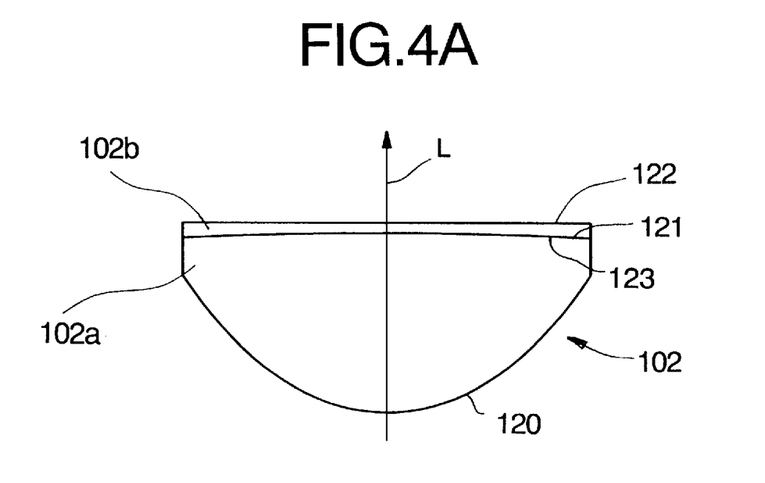
FIG. 4A is a longitudinal section view of an objective lens of a second embodiment.
Figure 4B:
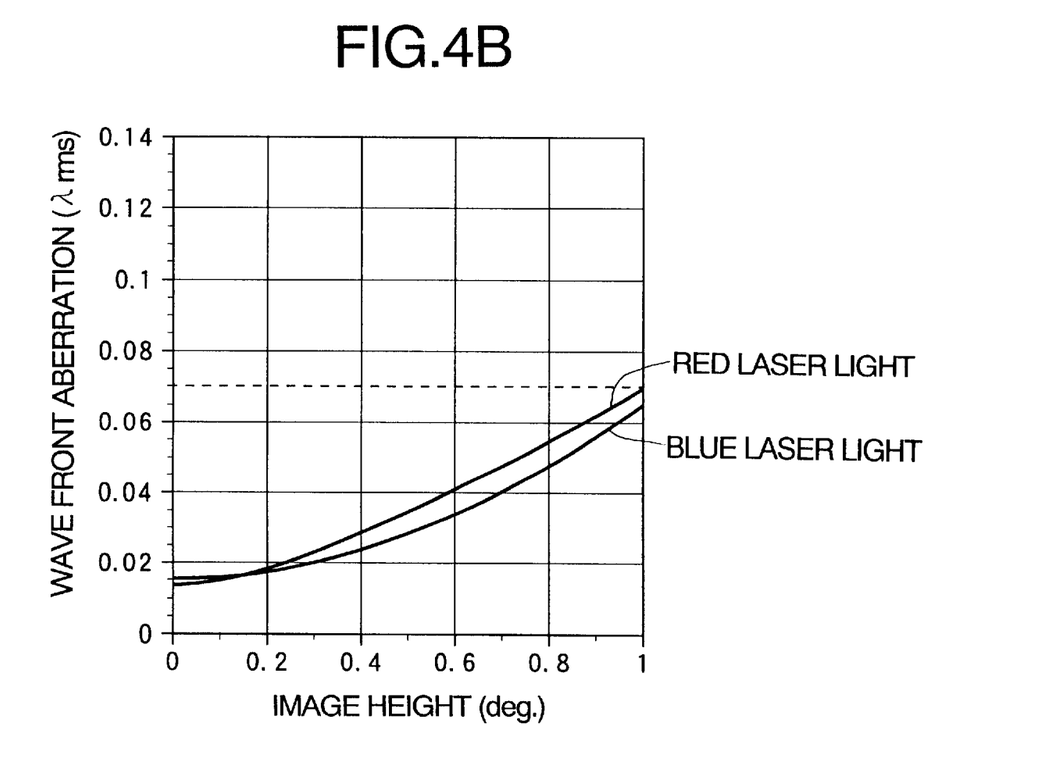
FIG. 4B is a view showing compensation for chromatic aberration of the objective lens shown in FIG. 4A.

In addition, FIG. 4A shows the sectional structure of an objective lens according to the second embodiment, and FIG. 4B is a view showing the performance thereof.

In the above-mentioned first embodiment, the emission surface 22 in the objective lens 2 is configured so as to be located on the same axis as the collective lens 2a and in the form of the axisymmetric rotational aspheric surface. However, the emission surface in the second embodiment is configured so as to be flat.

That is, as shown in FIG. 4A, an objective lens 102 in the second embodiment is provided with a collective lens 102a which collects any one of the red laser light beam BR and the blue laser light beam BB on any one of the information record surfaces 1b and 1c, and a contact lens 102b which is closely laminated on the collective lens 102a and then compensates the chromatic aberration occurring in the red laser light beam BR or the blue laser light beam BB by using the light collection action of the collective lens 102a, similarly to the objective lens 2 in the first embodiment.

Here, the collective lens 102a is created by machining and molding the plastic or the glass, similarly to the collective lens 2a in the first embodiment. On the other hand, the contact lens 102b is also made of the ultraviolet curing resin, such as the 2P and the like, similarly to the contact lens 2b in the first embodiment.

As for the respective forms, an incident surface 120 and a boundary surface 121 in the collective lens 102a and a boundary surface 123 in the contact lens 102b are configured so as to be located on the same axis and in the form of axisymmetric rotational aspheric surface whose symmetrical axis corresponds to an optical axis L of the red laser light beam BR or the blue laser light beam BB, similarly to the first embodiment.

On the contrary, an emission surface 122 of the contact lens 102b is configured so as to be flat and not curved.

Then, the method for creating the objective lens 102 is similar to that of the objective lens 2 in the first embodiment. Thus, the detailed explanation is omitted.

Moreover, an absolute value of a difference between an Abbe number ν dg' of the optical material constituting the collective lens 102a and an Abbe number ν dp' of the ultraviolet curing resin constituting the contact lens 102b is also set to be greater than 10. That is, the equation:

$$|\nu dg' - \nu dp'| > 10 \quad (8)$$

is defined.

Here, the Abbe number ν dg' is an Abbe number defined by using a refractive index Ndg' with respect to the helium d line, a refractive index NFg' with respect to the mercury F line and a refractive index NCg' with respect to the mercury C line, among the Abbe numbers of the optical material constituting the collective lens 102a., similarly to the above-mentioned Abbe number ν dg. Then, this ν dg' is represented as follows:

$$\nu dg' = (Ndg' - 1)/(NFg' - NCg') \quad (9)$$

Also, the Abbe number ν dp' is an Abbe number defined by using a refractive index Ndp', a refractive index NFp' and a refractive index NCp', among the Abbe numbers of the ultraviolet curing resin constituting the contact lens 102b, similarly to the above-mentioned Abbe number v dp. Then, this v dp' is represented as follows:

$$\text{vdp}' = (\text{Ndp}' - 1)/(\text{NFp}' - \text{NCp}')\text{tm} \quad (10)$$

The structure of the collective lens 102 will be further actually described below.

At first, actually, the material similar to the first embodiment (the combination of the M-BaCD5 made by HOYA Corporation as the material for the collective lens 102a and the 2P material made by DAINIHON INK Corporation as the material for the contact lens 102b or the combination of the M-Laf81 made by HOYA Corporation as the material for the collective lens 102a and the 2P material made by DAINIHON INK Corporation as the material for the contact lens 102b) can be used as the optical material constituting the collective lens 102a.

On the other hand, as the forms of the collective lens 102a and the contact lens 102b, it is proper to create them, for example, as follows.

That is, as for the incident surface 120, it is proper to let a curvature radius thereof be 2.212075 mm and an effective diameter thereof be 1.700000 mm and let a thickness of a center of the collective lens 102a be 2.000123 mm.

Also, as for the boundary surface 121, it is proper to let a curvature radius thereof be −12.383002 mm and an effective diameter thereof be 1.300000 mm.

Moreover, as for the emission surface 122, it is proper to let an effective diameter in a flat surface thereof be 1.700000 mm and let a thickness of a center of the contact lens 102b be 0.200000 mm.

Furthermore, as for the whole form of the incident surface 120, it is proper to respectively establish the aspherical coefficients representative of the form as follows:

| | |
|---|---|
| AS2 = 0.005128 | AS3 = −0.002359 |
| AS4 = 0.001213 | AS5 = −0.000213 |
| AS6 = −2.3664 × 10$^{-5}$ | AS7 = −1.3084 × 10$^{-5}$ |
| AS8 = 4.1032 × 10$^{-6}$ | (11) |

Also, as for the whole form of the boundary surface 121, it is proper to respectively establish the aspherical coefficients representative of the form as follows:

| | |
|---|---|
| AS2 = −0.65988 | AS3 = 0.049509 |
| AS4 = −0.015150 | AS5 = −0.007401 |
| AS6 = 0.002036 | AS7 = −0.003469 |
| AS8 = 0.002851 | (12) |

Degree of the compensation for the chromatic aberration in a case of using the objective lens 102 having the above-mentioned design values will be described below with reference to FIG. 4B.

In addition, in FIG. 4B, a horizontal axis indicates an angle of an image height, similarly to FIG. 1, and a vertical axis indicates a wave front aberration RMS.

As can be evident from FIG. 4B, according to the objective lens 102 created by using the above-mentioned design values, the chromatic aberration in the case where the angle of the image height is 1 degree as well as the case on the axis is excellently compensated for both the red laser light beam BR and the blue laser light beam BB. Only chromatic aberration lower than the above-mentioned Marshall limitation is induced in any case.

As mentioned above, according to the objective lens 102 in the second embodiment, the emission surface 122 is configured so as to be flat, in addition to the effect of the objective lens 2 in the first embodiment. Thus, it is possible to prevent eccentricity from occurring between the respective lens, when the contact lens 102b is closely laminated on the collective lens 102a to then create the objective lens 102. Hence, the objective lens 102 which can surely compensate the chromatic aberration can be created in a simple process.

A variation of the present invention will be described below with reference to FIG. 5.

Figure 5:
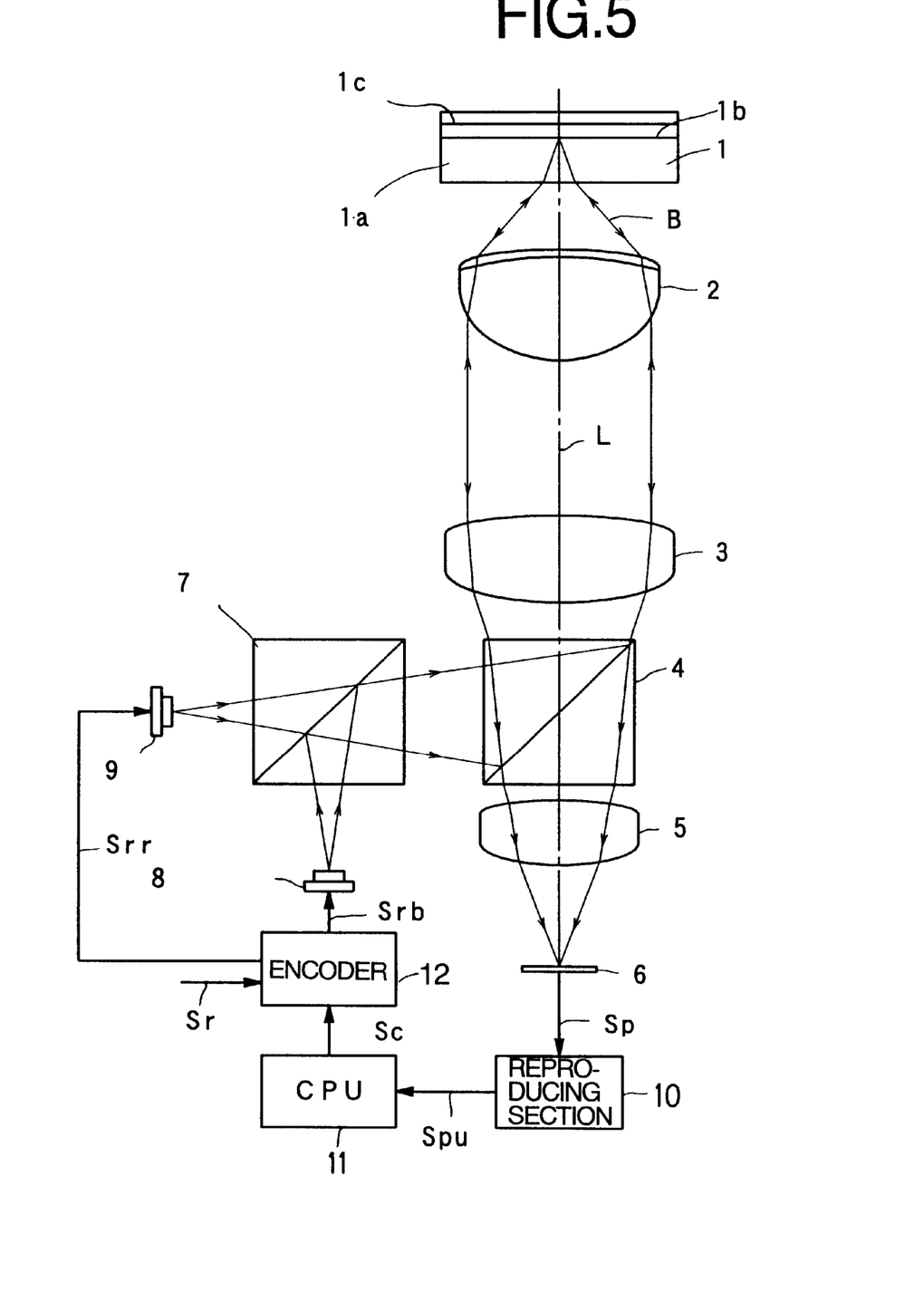
FIG. 5 is a block diagram showing another embodiment of an information recording apparatus.

In addition, FIG. 5 is a block diagram showing the schematic configuration of an information recording apparatus according to the variation.

In the above-mentioned respective embodiments, the embodiments are described in which the present invention is applied to the information reproducing apparatus. However, other than them, the present invention can be applied to the information recording apparatus for detecting record control information, such as address information and the like, which is recorded in advance on a high dense optical disk 1 or DVD, and then recording the information on the high dense optical disk 1 or the DVD in accordance with the detected record control information.

That is, as shown in FIG. 5, the present invention can be also applied to an information recording apparatus R, which in addition to the objective lens 2, the collimator lens 3, the polarization beam splitter 4, the collective lens 5, the detector 6, the dichroic prism 7, the red laser diode 9, the blue laser diode 8 and the reproducing section 10 shown in FIG. 2, comprises a CPU 11 serving as a part of a recording means for carrying out a record control in accordance with a reproduction signal Spu outputted by the reproducing section 10 (this reproduction signal Spu includes the record control information), and an encoder 12 serving as a part of the recording means for modulating a record signal Sr to be recorded which is inputted from an external portion based on a control signal Sc from the CPU 11 and then generating a modulation signal Srb (if the record information is recorded on the high dense optical disk 1) so that an output value of the blue laser diode 8 is a value corresponding to the record signal Sr or a modulation signal Srr (if the record information is recorded on the DVD) so that an output value of the red laser diode 9 is a value corresponding to the record signal Sr.

In this case, a strength of the output value of the blue laser diode 8 or the red laser diode 9 (namely, a strength of the blue laser light beam BB or the red laser light beam BR) is modulated in accordance with the modulation signal Srb or the modulation signal Srr. Then, the blue laser light beam BB or the red laser light beam BR whose strength is modulated is radiated to a position corresponding to the address information of the high dense optical disk 1 or the DVD included in the record control information. Accordingly, an information pit having a form corresponding to the modulation signal Srb or the modulation signal Srr is generated at the radiated position, and thereby the record signal Sr is recorded on the high dense optical disk 1 or the DVD.

According to the operation of the information recording apparatus R, the control information is reproduced in accordance with a reception signal Sp from the detector 6. Thus, the compensation for the chromatic aberration in each light beam enables the control information to be accurately obtained even if a single light beam is used among the respective light beams. Hence, a desired record information can be accurately recorded through the respective light beams.

Also, in the above-mentioned respective embodiments and variation, the respective transmission surfaces in the objective lens 2 and the respective transmission surfaces in the objective lens 102 except the emission surface 122 are configured so as to be the axisymmetric rotational aspheric surface. However, other than them, the respective transmission surfaces of the objective lens 102 except the emission surface 122 and the respective transmission surface in the objective lens 2 may be configured so as to be the spherical surface having a central axis corresponding to an optical axis L of each laser light beam .

Also in this case, the effects similar to the above-mentioned respective embodiments and variation can be obtained.

Moreover, in the above-mentioned respective embodiments and variation, the case is described in which the red laser diode 9 and the blue laser diode 8 are used as the light sources of emitting the respective laser light beams. However, other than them, the present invention may be applied to a case in which three or more laser diodes whose oscillation wave lengths are different from each other are used as the light sources.

In addition, also in this case, as a contact lens, it is necessary to closely laminate on a collective lens the number of contact lens which corresponds to the number of light sources.

The invention may be embodied in other specific forms without departing from the spirit or essential characteristics thereof. The present embodiments are therefore to be considered in all respects as illustrative and not restrictive, the scope of the invention being indicated pended claims rather than by the foregoing description and all which come within the meaning and range of equivalency of the therefore intended to be embraced therein.

The entire disclosure of Japanese Patent Application No. 10-255682 filed on Sep. 9, 1998 including the specification, claims, and summary is incorporated herein by reference in its entirely.

What is claimed is:

1. An optical pickup comprising:
    a light source for emitting a plurality of light beams whose wavelengths are different from each other; and
    an objective lens comprising a first lens for collecting each of the plurality of light beams onto a recording medium, and a second lens for compensating wave front aberration in the plurality of light beams, the second lens being placed on the first lens in contact and being located across an optical path of each of the plurality of light beams.

2. The optical pickup according to claim 1, wherein the light source emits a first light beam and a second light beam, and the first light beam is different from the second light beam in wavelength.

3. The optical pickup according to claim 2, wherein the first light beam is 650 nm in wavelength and the second light beam is 430 nm in wavelength.

4. The optical pickup according to claim 1, wherein the second lens is made of ultraviolet curing resin.

5. The optical pickup according to claim 1, wherein the second lens is made of photo polymer.

6. The optical pickup according to claim 1, wherein an absolute value of a difference between an Abbe number of the first lens and an Abbe number of the second lens is greater than 10, and each of the Abbe numbers is defined by using a refractive index with respect to helium d line, a refractive index with respect to mercury F line and a refractive index with respect to mercury C line.

7. The optical pickup according to claim 1, wherein the second lens has a first surface and a second surface which are opposite each other and both of which are located across the optical path of each of the plurality of the light beams, the first surface is in contact with the first lens, and the second surface is flat.

8. The optical pickup according to claim 1, wherein an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is an axisymmetric aspheric-surface whose symmetry axis corresponds to each of the central axis of the first lens and the central axis of the second lens.

9. The optical pickup according to claim 1, wherein an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is a spherical surface.

10. An information reproducing apparatus for reproducing information recorded on a recording medium, comprising:
    an optical pickup for optically reading the information from the recording medium and generating a reading signal corresponding to the read information; and
    a reproducing device for reproducing the information on the basis of the reading signal,
    wherein the optical pickup comprises:
        a light source for emitting a plurality of light beams whose wavelengths are different from each other; and
        an objective lens comprising a first lens for collecting each of the plurality of light beams onto the recording medium, and a second lens for compensating wave front aberration in the plurality of light beams, the second lens being placed on the first lens in contact and being located across an optical path of each of the plurality of light beams.

11. The information reproducing apparatus according to claim 10, wherein the light source emits a first light beam and a second light beam, and the first light beam is different from the second light beam in wavelength.

12. The information reproducing apparatus according to claim 11, wherein the first light beam is 650 nm in wavelength and the second light beam is 430 nm in wavelength.

13. The information reproducing apparatus according to claim 10, wherein the second lens is made of ultraviolet curing resin.

14. The information reproducing apparatus according to claim 10, wherein the second lens is made of photo polymer.

15. The information reproducing apparatus according to claim 10, wherein an absolute value of a difference between an Abbe number of the first lens and an Abbe number of the second lens is greater than 10, and each of the Abbe numbers is defined by using a refractive index with respect to helium d line, a refractive index with respect to mercury F line and a refractive index with respect to mercury C line.

16. The information reproducing apparatus according to claim 10, wherein the second lens has a first surface and a second surface which are opposite each other and both of which are located across the optical path of each of the plurality of the light beams, the first surface is in contact with the first lens, and the second surface is flat.

17. The information reproducing apparatus according to claim 10, wherein an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is an axisymmetric aspheric-surface whose symmetry axis corresponds to each of the central axis of the first lens and the central axis of the second lens.

18. The information reproducing apparatus according to claim 10, wherein an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is a spherical surface.

19. An information recording apparatus for recording record information onto a recording medium in accordance with control information read from the recording medium, the information recording apparatus comprising:

an optical pickup for optically reading the control information from the recording medium, generating a reading signal corresponding to the read control information, and optically recording the record information onto the recording medium;

a reproducing device for reproducing the control information on the basis of the reading signal, and generating a control signal corresponding to the reproduced control information; and a recording control device for controlling a recording operation of the optical pickup on the basis of the control signal and the record inform ion, wherein the optical pickup comprises:

a light source for emitting a plurality of light beams whose wavelengths are different from each other; and an objective lens comprising a first lens for collecting each of the plurality of light beams onto the recording medium, and a second lens for compensating wave front aberration in the plurality of light beams, the second lens being placed on the first lens in contact and being located across an optical path of each of the plurality of light beams.

20. The information recording apparatus according to claim 19, wherein the light source emits a first light beam and a second light beam, and the first light beam is different from the second light beam in wavelength.

21. The information recording apparatus according to claim 20, wherein the first light beam is 650 nm in wavelength and the second light beam is 430 nm in wavelength.

22. The information recording apparatus according to claim 19, wherein the second lens is made of ultraviolet curing resin.

23. The information recording apparatus according to claim 19, wherein the second lens is made of photo polymer.

24. The information recording apparatus according to claim 19, wherein an absolute value of a difference between an Abbe number of the first lens and an Abbe number of the second lens is greater than 10, and each of the Abbe numbers is defined by using a refractive index with respect to helium d line, a refractive index with respect to mercury F line and a refractive index with respect to mercury C line.

25. The information recording apparatus according to claim 19, wherein the second lens has a first surface and a second surface which are opposite each other and both of which are located across the optical path of each of the plurality of the light beams, the first surface is in contact with the first lens, and the second surface is flat.

26. The information recording apparatus according to claim 19, wherein an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is an axisymmetric aspheric-surface whose symmetry axis corresponds to each of the central axis of the first lens and the central axis of the second lens.

27. The information recording apparatus according to claim 19, wherein an central axis of the first lens corresponds to an central axis of the second lens, the second lens has a first surface and a second surface which are opposite each other and both of which are located across the optical path of each of the plurality of the light beams, the first lens has a third surface and a fourth surface which are opposite each other and both of which are located across the optical path of each of the plurality of the light beams, each of the first surface, the second surface, the third surface and the fourth surface is a spherical surface.

28. The optical pickup according to claim 1, wherein the wave front aberration is chromatic aberration.

29. The information reproducing apparatus according to claim 10, wherein the wave front aberration is chromatic aberration.

30. The information recording apparatus according to claim 19, wherein the wave front aberration is chromatic aberration.

* * * * *